United States Patent [19]

Iga et al.

[11] 3,903,226

[45] Sept. 2, 1975

[54] METHOD OF MAKING VOLTAGE-DEPENDENT RESISTORS

[75] Inventors: Atsushi Iga, Takatsuki; Osamu Makino, Hirakata; Michio Matsuoka, Ibaragi; Takeshi Masuyama, Takatsuki, all of Japan

[73] Assignee: Matsushita Electric Industrial Co., Ltd., Japan

[22] Filed: Dec. 16, 1974

[21] Appl. No.: 533,090

[30] Foreign Application Priority Data
Dec. 20, 1973 Japan.................................. 49-2937

[52] U.S. Cl. .................. 264/66; 106/39.5; 252/518; 252/519; 252/520; 252/521; 264/61
[51] Int. Cl.² ............... C04B 35/02; C04B 37/02; H01C/7/06
[58] Field of Search ......... 106/39.5; 252/518, 519, 252/520; 264/66, 61

[56] References Cited
UNITED STATES PATENTS
3,037,942  6/1962  Ingold et al..................... 252/520 X
3,617,592  11/1971  Arrance........................ 106/39.5 X
3,805,114  4/1974  Matsuoka et al................. 252/518 X FOREIGN PATENTS OR APPLICATIONS
2,023,507  8/1970  France OTHER PUBLICATIONS
Chem. Abstracts, 74 (1971), 132112a.
Gupta, T. K.; "Inhibition of Grain Growth in ZnO," J. Am. Cer. Soc., 54 (8), (1971), pp. 413-414.

*Primary Examiner*—Helen M. McCarthy
*Attorney, Agent, or Firm*—Wenderoth, Lind & Ponack

[57] ABSTRACT

Voltage-dependent resistors comprising a sintered, homogeneous body of zinc oxide, and a small distribution of C-values, are made by first calcining the mixture of zinc oxide, as a main constituent, and bismuth oxide, as a first additive(s), and then by adding further additive and sintering the mixture.

6 Claims, No Drawings

METHOD OF MAKING VOLTAGE-DEPENDENT RESISTORS

This invention relates to a method of making a voltage-dependent resistors having non-ohmic resistance due to the bulk thereof and more particularly to a method of making varistors comprising zinc oxide and bismuth oxide with less distributed varistor voltage.

Various voltage-dependent resistors such as silicon carbide varistors, selenium rectifiers and germanium or silicon p-n junction diodes have been widely used for stabilization of voltage or current of electrical circuits. The electrical characteristics of such a voltage-dependent resistor are expressed by the relation:

$$I = \left(\frac{V}{C}\right)^n$$

where $V$ is the voltage across the resistor, $I$ is the current flowing through the resistor, $C$ is a constant corresponding to the voltage at a given current and exponent $n$ is a numerical value greater than 1. The value of $n$ is calculated by the following equation:

$$n = \frac{\log_{10}(I_2/I_1)}{\log_{10}(V_2/V_1)}$$

where $V_1$ and $V_2$ are the voltages at a given currents $I_1$ and $I_2$, respectively. The desired value of $C$ depends upon the kind of application to which the resistor is to be put. It is ordinarily desirable that the value of $n$ be as large as possible since this exponent determines the degree to which the resistors depart from ohmic characteristics.

Certain prior art relates to voltage-depenent resistors comprising a zinc oxide sintered body having electrodes applied to the opposite surfaces thereof, for example as seen in U.S. Pat. No. 3,663,458. U.S. Pat. No. 3,663,458 discloses voltage-dependent resistors having voltage-nonlinearity due to the bulk thereof and being characterized by a high n-value. That is, there is provided a voltage-dependent resistor comprising a sintered body in a composition consisting essentially of 80.0 to 99.9 mole % of zinc oxide, 0.05 to 10.0 mole percent of bismuth oxide and 0.05 to 10.0 mole percent, in total, of at least one member selected from the group consisting of cobalt oxide, manganese oxide, indium oxide, antimony oxide, titanium oxide, boron oxide, aluminium oxide, tin oxide, barium oxide, nickel oxide, molybdenum oxide, tantalum oxide, iron oxide, and chromium oxide, and ohmic electrodes applied to the opposite surfaces of said sintered body.

Such a voltage-dependent resistor has a non-ohmic resistance due to its bulk. Therefore, its C-value can be changed without impairing the n-value by changing the distance between said opposite surfaces. The shorter distance results in a lower C-value. The bulk type voltage-dependent resistor thus obtained has a high n-value as well as stability against current, and can be widely used for stabilization of voltage or surge current absorption in the electrical circuits.

In practical use, C-value is selected to suit the line voltage of the circuit or the pulse height of the current. Therefore, it is very important that the electric characteristics be stable and in the ordered range of the values, and to achieve this, quality of the produced device should be well controlled.

However, in the conventional voltage-dependent resistors comprising a zinc oxide sintered body, there is a defect in that the C-value is not constant and it is impossible to avoid some distribution of C-values. There are two reasons for such distribution of the C-value. One is due to the distribution of lapped thickness of the sintered body and the other is due to distribution of each C-value itself per unit thickness. The latter is considered due to inhomogeneity in the sintered body. Since, the thickness of the lapped body can be controlled within a rather high accuracy such as ±1%, a wide distribution in the C-value is mainly due to the inhomogeneity in the sintered body. In order to reduce such the distribution in the C-value, there have been performed some trials, for example, to change the conditions of manufacturing the sintered body such as the time of pulverising or mixing, calcining temperature, sintering temperature or time, and so on. As the C-value per unit thickness changes with each produced lot, the thickness to be lapped is determined respectively according to the preceding test. Therefore, even though there are provided devices which have the mean C-value in the ordered range, still, the C-value of each resistor distributed in that ordered range. For distribution of the grain size in the sintered body, a current focuses on the grains of a large grain size rather than small grains of high resistance and so the distribution of the C-value, i.e. the inhomogeneity in the sintered body, causes degradation of the voltage-dependent characteristics of the resultant resistors.

Therefore, an object of the present invention is to provide an improved voltage-dependent resistor having stable characteristics.

A further object of the present invention is to provide a voltage-dependent resistor comprising a sintered body of zinc oxide and having a stable C-value over a wide current range.

A further object of the invention is to provide a novel and improved method of making a voltage-dependent resistor comprising a homogeneous sintered body of zinc oxide, and thereby being characterized by the stable characteristics.

These objects are achieved by the method of the present invention, which comprises the steps of preparing a mixture of zinc oxide, as a main constituent, and 0.1 and 5.0 mole percent of bismuth oxide ($Bi_2O_3$); calcining the thus prepared mixture of zinc oxide (ZnO) and bismuth oxide ($Bi_2O_3$) at a temperature between 650° and 950°C; adding to the thus calcined mixture a further additive component comprising at least one member selected from the group consisting of 0.1 to 5.0 mole percent of cobalt oxide (CoO) and 0.1 to 5.0 mole percent of manganese oxide ($MnO_2$); pulverizing the thus made mixture having a further additive component; sintering the thus pulverized mixture so as to obtain a sintered body; and applying electrodes to opposite surfaces of said sintered body.

The sintered body can be prepared by a per se well known ceramic technique. The starting materials in the compositions of zinc oxide and bismuth oxide are mixed in a wet mill so as to produce homogeneous mixtures. The mixtures are dried and calcined in air, and after calcining, further additive components are added to the calcined mixture and mixed therewith. After that, the resultant mixtures are pulverized in a wet mill so as to produce homogeneous mixtures. These mixtures are again dried and pressed in a mold into desired shapes at a pressure from 100 kg/cm² to 1000 kg/cm². The pressed bodies are sintered in air at a given temperature for 1 to 3 hours, and then furnace-cooled to room temperature. The sintering temperature is determined from the view of electrical resistivity, nonlinearity and stability The preferred amount of bismuth oxide to be added to zinc oxide is 0.1 to 5.0 mole % to provide the effect of the process of this invention. Although in the Example represented hereinafter, all of the bismuth oxide is added to zinc oxide and the mixture is calcined, it is also possible to added a part of the total amount, which is defined as 0.1 to 5.0 mole %, of bismuth oxide to zinc oxide as the starting mixture i.e. at the time of calcining and to add the remainder to the calcined mixture, together with the further additives, i.e. cobalt oxide and manganese oxide, at the time of pulverising. In the latter case, the amount of bismuth oxide to be first added to zinc oxide for calcining should be at least more than 0.05 mole %. The effect of providing the homogeneous sintered body in the latter case is also remarkably similar to the former case wherein all of the bismuth oxide is added at once to zinc oxide prior to calcining. Further, the other bismuth component may be employed instead of bismuth oxide, if it is converted to the oxide at a high temperature during calcining and sintering.

With respect to the aforesaid sintered body of zinc oxide having combined addition of bismuth oxide and at least one metal oxide selected from the group consisting of cobalt oxide and manganese oxide, the preferable firing temperature ranges from 1000° to 1450°C. For the temperature of calcining the starting mixture of zinc oxide and bismuth oxide, the preferable range is 650°C to 950°C. The calcining temperature lower than 650°C is not practical because it results in too slow a reaction, and a calcining temperature higher than 950°C is undesirable because it results in oversintering and therefore difficulty of pulverization.

As shown in the Examples represented hereinafter, to immprove the electric characteristics of the resultant resistors, it is advantageous to add further additive components, besides cobalt oxide and manganese oxide, to the pulverized mixture of the starting materials, i.e. zinc oxide and bismuth oxide, such components as Sb, Ti, Be, Sn, Cr, Si, Ni, Mg, Ba, B, etc. Further, there additive components are not limited to the oxide, and there may be employed fluorides and carbonates.

The mixture to be pressed may be admixed with a suitable binder such as water, polyvinyl alcohol, etc.

It is advantageous that the sintered body is lapped at the opposite surfaces by abrasive powder such as silicon carbide in a particle size of 300 mesh to 1500 mesh.

The sintered bodies are provided at the opposite surfaces thereof, with aforesaid ohmic electrodes in any conventionally available and suitable method.

Lead wires can be attached to the silver electrodes in a per se conventional manner by using conventional solder having a low melting point.

The C-values of the voltage-dependent resistors made according to the method of the invention have a small distribution and the resistors have a high stability with respect to temperature, which is confirmed, for example in the load life test carried out at 70°C at a rating power for 500 hours. The n-values and C-values of the resultant resistor do not change too much even after heating cycles and the load life test. It is preferable, in order to achieve a high stability to humidity, that the resultant voltage-dependent resistors be embedded in a humidity proof resin such as an epoxy or phenol resin in a per se well known manner.

An embodiment of the invention is described in the following Examples, in which, to define the distribution of the C-values, standard deviation is used. That is, when the samples of $n$ pieces of voltage-dependent resistors have the C-values of $C_1, C_2, C_3 \ldots, C_n$, respectively, the central value $C_o$ of these C-values and the standard deviation $\sigma_c$ are defined by the following equations:

$$C_o = \frac{C_1 + C_2 + C_3 + \ldots + C_n}{n}$$

$$\sigma_c = \frac{(C_1-C_o)^2 + (C_2-C_o)^2 + (C_3-C_o)^2 + \ldots + (C_n-C_o)^2}{n}$$

Since the C-value is a voltage between the electrodes of the voltage-dependent resistor at a given current as described hereinbefore, $\sigma_c$ is also represented in a units of voltage. Practically, it is convenient to define the C-value with a current of 1mA.

EXAMPLE 1

The starting materials, zinc oxide (ZnO) and bismuth oxide (Bi₂O₃) listed in Table 1, were mixed in a wet mill for 5 hours. The mixture was dried and calcined in air for 1 hour at the temperature listed in Table 1 and then furnace-cooled to room temperature. Further additives components listed in Table 1 were added to the calcined mixture and the mixture was pulverized in a wet mill for 20 hours. The pulverized mixed powder was dried and pressed in a mold into a disc of 17.5 mm diameter and 2.5mm thickness under a pressure of 340 kg/cm². The pressed body was sintered in air for 1 hour at 1350°C and then furnace-cooled to room temperature. The sintered disc was lapped to the thickness of 1 mm at the opposite surfaces thereof by a silicon carbide abrasive with a particle of 600 mesh. The opposite surfaces of sintered disc were provided with an evaporated film of indium metal.

The electrical characteristics of the resultant resistor were measured for 100 resistor pieces and, the results of the measurements are shown in Table 1. It will be readily understood that the $\sigma_c$-values have a tendency to become nearly equal to each other independently of the C-value. When the voltage-dependent resistors, which have the same size as that of this Example, were made by the usual process, in which any kind of calcining is not performed, the $\sigma_c$-values of the resultant 100 resistors were all larger than 5. In case of calcining the mixture of zinc oxide and all of the additives, i.e. bismuth oxide, cobalt oxide and manganese oxide, at a temperature between 650°C and 950°C, the $\sigma_c$-value ranged from 4.0 to 5.0 for 100 pieces, showing little reduction of inhomogeneity and distribution of the C-value. Also, both the C-values and the n-values of the resultant voltage-dependent resistors were increased a little, respectively. On the contrary, the $\sigma_c$-values of the voltage-dependent resistors made by the method of the present invention were from 2.3 to 4.0, as shown in Table 1, with the higher n-values and C-values. The preferred calcining temperature for the mixture of zinc oxide (ZnO) with bismuth oxide (Bi₂O₃) ranges from 750°C to 850°C, as understood from Table 1.

TABLE 1

| Calcining Temperature [°C] | Starting Materials (mole %) | | | | Electric Characteristics of Resultant Resisters | | |
|---|---|---|---|---|---|---|---|
| | ZnO | First Additive | Further Additive Component | | C (at given current of 1mA) | $\sigma_c$ | n 0.1–1mA |
| | | $Bi_2O_3$ | CoO | $MnO_2$ | | | |
| 650 | 99.8 | 0.1 |  | 0.1 | 51 | 3.5 | 8.8 |
| 650 | 99.0 | 0.5 |  | 0.5 | 57 | 3.2 | 16.2 |
| 650 | 97.0 | 1.5 |  | 1.5 | 74 | 3.3 | 13.2 |
| 650 | 90.0 | 5.0 |  | 5.0 | 95 | 3.9 | 7.1 |
| 650 | 94.9 | 0.1 |  | 5.0 | 62 | 3.7 | 6.8 |
| 650 | 94.9 | 5.0 |  | 0.1 | 73 | 3.4 | 9.0 |
| 750 | 99.8 | 0.1 |  | 0.1 | 52 | 2.4 | 10.1 |
| 750 | 99.0 | 0.5 |  | 0.5 | 61 | 2.4 | 18.1 |
| 750 | 97.0 | 1.5 |  | 1.5 | 78 | 2.6 | 14.5 |
| 750 | 90.0 | 5.0 |  | 5.0 | 96 | 2.8 | 7.5 |
| 750 | 94.9 | 0.1 |  | 5.0 | 64 | 2.7 | 6.7 |
| 750 | 94.9 | 5.0 |  | 0.1 | 78 | 2.6 | 8.8 |
| 850 | 99.8 | 0.1 |  | 0.1 | 55 | 2.6 | 9.7 |
| 850 | 99.0 | 0.5 |  | 0.5 | 62 | 2.5 | 17.8 |
| 850 | 97.0 | 1.5 |  | 1.5 | 80 | 2.5 | 14.0 |
| 850 | 90.0 | 5.0 |  | 5.0 | 101 | 3.0 | 8.4 |
| 850 | 94.9 | 0.5 |  | 5.0 | 68 | 2.9 | 8.7 |
| 850 | 94.9 | 5.0 |  | 0.1 | 81 | 2.7 | 9.3 |
| 950 | 99.8 | 0.1 |  | 0.1 | 55 | 3.7 | 9.2 |
| 950 | 99.0 | 0.5 |  | 0.5 | 63 | 3.0 | 17.0 |
| 950 | 97.0 | 1.5 |  | 0.5 | 83 | 3.3 | 14.0 |
| 950 | 90.0 | 5.0 |  | 5.0 | 103 | 3.7 | 7.8 |
| 950 | 94.9 | 0.5 |  | 5.0 | 70 | 3.6 | 7.9 |
| 950 | 94.9 | 5.0 |  | 0.1 | 83 | 3.4 | 8.1 |
| 650 | 99.8 | 0.1 | 0.1 |  | 42 | 3.3 | 7.1 |
| 650 | 99.0 | 0.5 | 0.5 |  | 44 | 3.1 | 15.7 |
| 650 | 97.0 | 1.5 | 1.5 |  | 53 | 3.2 | 11.9 |
| 650 | 90.0 | 5.0 | 5.0 |  | 73 | 3.6 | 7.4 |
| 650 | 94.9 | 0.1 | 5.0 |  | 49 | 3.6 | 8.3 |
| 650 | 94.9 | 5.0 | 0.1 |  | 68 | 3.4 | 6.9 |
| 750 | 99.8 | 0.1 | 0.1 |  | 44 | 2.4 | 7.3 |
| 750 | 99.0 | 0.5 | 0.5 |  | 45 | 2.3 | 17.2 |
| 750 | 97.0 | 1.5 | 1.5 |  | 57 | 2.3 | 13.2 |
| 750 | 90.0 | 5.0 | 5.0 |  | 79 | 2.9 | 7.3 |
| 750 | 94.9 | 0.1 | 5.0 |  | 47 | 2.5 | 9.1 |
| 750 | 94.9 | 5.0 | 0.1 |  | 70 | 2.4 | 7.5 |
| 850 | 99.8 | 0.1 | 0.1 |  | 43 | 2.3 | 7.8 |
| 850 | 99.0 | 0.5 | 0.5 |  | 46 | 2.4 | 17.1 |
| 850 | 97.0 | 1.5 | 1.5 |  | 54 | 2.4 | 12.5 |
| 850 | 90.0 | 5.0 | 5.0 |  | 77 | 2.8 | 7.0 |
| 850 | 94.9 | 0.1 | 5.0 |  | 49 | 2.6 | 9.4 |
| 850 | 94.9 | 5.0 | 0.1 |  | 72 | 2.5 | 7.9 |
| 950 | 99.8 | 0.1 | 0.1 |  | 47 | 3.9 | 8.2 |
| 950 | 99.0 | 0.5 | 0.5 |  | 48 | 3.6 | 16.5 |
| 950 | 97.0 | 1.5 | 1.5 |  | 59 | 3.6 | 12.0 |
| 950 | 90.0 | 5.0 | 5.0 |  | 79 | 4.0 | 7.2 |
| 950 | 94.9 | 0.1 | 5.0 |  | 53 | 3.9 | 8.9 |
| 950 | 94.9 | 5.0 | 0.1 |  | 73 | 3.7 | 7.6 |
| 650 | 99.7 | 0.1 | 0.1 | 0.1 | 45 | 3.9 | 8.7 |
| 650 | 98.9 | 0.5 | 0.5 | 0.5 | 48 | 3.4 | 10.1 |
| 650 | 89.9 | 0.1 | 5.0 | 5.0 | 49 | 3.4 | 7.6 |
| 650 | 99.3 | 0.5 | 0.1 | 0.1 | 47 | 3.8 | 9.8 |
| 650 | 98.5 | 0.5 | 0.5 | 0.5 | 51 | 3.2 | 15.2 |
| 650 | 89.5 | 0.5 | 5.0 | 5.0 | 81 | 3.5 | 12.0 |
| 750 | 98.3 | 1.5 | 0.1 | 0.1 | 60 | 2.4 | 11.2 |
| 750 | 97.5 | 1.5 | 0.5 | 0.5 | 68 | 2.4 | 15.9 |
| 750 | 88.5 | 1.5 | 5.0 | 5.0 | 84 | 2.7 | 7.2 |
| 750 | 94.8 | 5.0 | 0.1 | 0.1 | 71 | 2.3 | 6.9 |
| 750 | 94.0 | 5.0 | 0.5 | 0.5 | 79 | 2.3 | 8.2 |
| 750 | 85.0 | 5.0 | 5.0 | 5.0 | 88 | 2.7 | 6.6 |
| 850 | 99.7 | 0.1 | 0.1 | 0.1 | 47 | 2.7 | 8.4 |
| 850 | 98.9 | 0.1 | 0.5 | 0.5 | 52 | 2.5 | 10.5 |
| 850 | 89.9 | 0.1 | 5.0 | 5.0 | 55 | 2.8 | 6.8 |
| 850 | 99.3 | 0.5 | 0.1 | 0.1 | 49 | 2.8 | 10.8 |
| 850 | 98.5 | 0.5 | 0.5 | 0.5 | 54 | 2.4 | 17.0 |
| 850 | 89.5 | 0.5 | 5.0 | 5.0 | 83 | 2.6 | 11.2 |
| 950 | 98.3 | 1.5 | 0.1 | 0.1 | 61 | 3.4 | 12.4 |
| 950 | 97.5 | 1.5 | 0.5 | 0.5 | 68 | 3.1 | 18.2 |
| 950 | 88.5 | 1.5 | 5.0 | 5.0 | 85 | 3.9 | 12.1 |
| 950 | 94.8 | 5.0 | 0.1 | 0.1 | 73 | 3.4 | 8.8 |
| 950 | 94.0 | 5.0 | 0.5 | 0.5 | 81 | 3.3 | 13.2 |
| 950 | 85.0 | 5.0 | 5.0 | 5.0 | 89 | 3.8 | 12.5 |

Although not shown in Table 1, similar results with respect to small standard deviation of distribution of the C-values with the high C-values and n-values were obtained when the starting mixture of zinc oxide and a part of the defined amount of the first additive, i.e. bismuth oxide, were calcined and after pulverization of the calcined mixture, the remainder of the first additive, and a further additive component, i.e. CoO and/or $MnO_2$, were sintered. Similar results were also observed in the following Examples 2 to 5.

EXAMPLE 2

The starting materials, zinc oxide (ZnO) and bismuth oxide ($Bi_2O_3$), listed in Table 2, were mixed in a wet mill for 5 hours. The mixture thus obtained was dried and calcined in air for 1 hour at 750°C and furnace-cooled to room temperature. Further additive component listed in Table 2 were added to the calcined mixture and thus added mixture was pulverized in a wet mill for 20 hours. Then, the pulverized mixture was dried, pressed, sintered and lapped in the same manner as in Example 1, and the electrodes were applied to the resultant bodies, similarly to Example 1. The electric characteristics of the resultant resistors are shown in Table 2, in which the $\sigma_c$-value is calculated for 100 resistor pieces. While the $\sigma_c$-value of resistors having the same composition as that of Table 2 and being made by usual process ranges from 2.5 to 4.0, the $\sigma_c$-value of the C-values of the resistors made by the method of the invention is remarkably reduced to 1.7 to 2.2, as shown in Table 2.

EXAMPLE 3

The starting materials, zinc oxide (ZnO) and bismuth oxide ($Bi_2O_3$), listed in Table 3, were mixed in a wet mill for 5 hours. The mixture thus obtained was dried and calcined in air for 1 hour at 750°C and furnace cooled to room temperature. Further additive components listed in Table 3 were added to the calcined mixture and thus added mixture was pulverized in a wet mill for 20 hours. Then, the pulverized mixture was dried, pressed, sintered and lapped in the same manner as that in Example 1, and the electrodes were applied to the resultant bodies, similarly to Example 1. The electric characteristics of the resultant resistors are shown in Table 3, in which the $\sigma_c$-value is calculated for 100 resistor pieces. While the $\sigma_c$-value of resistors having the same composition as that of Table 3 and being made by usual process ranges from 2.0 to 3.5, the $\sigma_c$-value for the invention is remarkably reduced to 1.1 to 1.6, as shown in Table 3.

Table 3

| Starting Materials (mole %) | | | | | | | | | | | | Electric Characteristics of Resultant Resistors | | |
|---|---|---|---|---|---|---|---|---|---|---|---|---|---|---|
| | First Additive | | | | Further Additive Component | | | | | | | C (at given current of 1mA) | $\sigma_c$ | n 0.1–1mA |
| ZnO | $Bi_2O_3$ | CoO | $MnO_2$ | $Sb_2O_3$ | $SnO_2$ | $Cr_2O_3$ | $SiO_2$ | NiO | MgO | BaO | $B_2O_3$ | | | |
| 99.5 | 0.5 | 0.5 | | 1.0 | 0.5 | | | | | | | 108 | 1.6 | 38 |
| 97.5 | 0.5 | | 0.5 | 1.0 | 0.5 | | | | | | | 108 | 1.6 | 37 |
| 97.0 | 0.5 | 0.5 | 0.5 | 1.0 | 0.5 | | | | | | | 110 | 1.5 | 40 |
| 97.95 | 0.5 | 0.5 | | 1.0 | | 0.05 | | | | | | 81 | 1.4 | 39 |
| 97.95 | 0.5 | | 0.5 | 1.0 | | 0.05 | | | | | | 84 | 1.4 | 40 |
| 97.45 | 0.5 | 0.5 | 0.5 | 1.0 | | 0.05 | | | | | | 85 | 1.4 | 40 |
| 97.5 | 0.5 | 0.5 | | 1.0 | | 0.5 | | | | | | 115 | 1.6 | 42 |
| 97.5 | 0.5 | | 0.5 | 1.0 | | 0.5 | | | | | | 121 | 1.6 | 44 |
| 97.0 | 0.5 | 0.5 | 0.5 | 1.0 | | 0.5 | | | | | | 122 | 1.5 | 43 |
| 97.5 | 0.5 | 0.5 | | 1.0 | | | 0.5 | | | | | 135 | 1.5 | 43 |
| 97.5 | 0.5 | | 0.5 | 1.0 | | | 0.5 | | | | | 138 | 1.6 | 45 |
| 97.0 | 0.5 | 0.5 | 0.5 | 1.0 | | | 0.5 | | | | | 142 | 1.6 | 45 |
| 97.5 | 0.5 | 0.5 | | 1.0 | | | | 0.5 | | | | 78 | 1.5 | 35 |
| 97.5 | 0.5 | | 0.5 | 1.0 | | | | 0.5 | | | | 78 | 1.6 | 35 |
| 97.0 | 0.5 | 0.5 | 0.5 | 1.0 | | | | 0.5 | | | | 81 | 1.6 | 37 |
| 97.5 | 0.5 | 0.4 | | 1.0 | | | | | 0.5 | | | 76 | 1.5 | 38 |
| 97.5 | 0.5 | | 0.5 | 1.0 | | | | | 0.5 | | | 78 | 1.5 | 39 |
| 97.0 | 0.5 | 0.5 | 0.5 | 1.0 | | | | | 0.5 | | | 79 | 1.5 | 39 |
| 97.0 | 0.5 | 0.5 | 0.5 | 1.0 | | | | | | 0.5 | | 82 | 1.6 | 33 |
| 97.0 | 0.5 | 0.5 | 0.5 | 1.0 | | | | | | | 0.5 | 76 | 1.5 | 35 |
| 91.5 | 0.5 | 0.5 | 0.5 | 2.0 | | | | | | | | 178 | 1.2 | 43 |
| 96.5 | 0.5 | 0.5 | 0.5 | 1.0 | | | | | | | | 133 | 1.3 | 44 |
| 96.8 | 0.5 | 0.5 | 0.5 | 1.0 | 0.5 | | | | | 0.1 | 0.1 | 105 | 1.1 | 40 |
| 96.8 | 0.5 | 0.5 | 0.5 | 1.0 | | 0.5 | | | | 0.1 | 0.1 | 127 | 1.1 | 42 |

EXAMPLE 4

The starting materials, zinc oxide (ZnO) and bismuth oxide ($Bi_2O_3$), listed in Table 4, were mixed in a wet Table 2

| Starting Materials (mole %) | | | | | | | Electric Characteristics of Resultant Resistors | | |
|---|---|---|---|---|---|---|---|---|---|
| | First Additive | Further Additive component | | | | | C (at given current of 1mA) | $\sigma_c$ | n 0.1–1mA |
| ZnO | $Bi_2O_3$ | CoO | MnO | $Sb_2O_3$ | $TiO_2$ | BeO | | | |
| 98.98 | 0.5 | 0.5 | | 0.02 | | | 42 | 2.2 | 25 |
| 98.98 | 0.5 | | 0.5 | 0.02 | | | 55 | 2.0 | 26 |
| 98.48 | 0.5 | 0.5 | 0.5 | 0.02 | | | 51 | 1.8 | 26 |
| 98.0 | 0.5 | 0.5 | | 1.0 | | | 75 | 2.1 | 29 |
| 98.0 | 0.5 | | 0.5 | 1.0 | | | 77 | 2.1 | 31 |
| 97.5 | 0.5 | 0.5 | 0.5 | 1.0 | | | 77 | 2.0 | 34 |
| 98.5 | 0.5 | 0.5 | | | 0.5 | | 21 | 1.8 | 20 |
| 98.5 | 0.5 | | 0.5 | | 0.5 | | 28 | 1.8 | 22 |
| 98.0 | 0.5 | 0.5 | 0.5 | | 0.5 | | 25 | 1.8 | 23 |
| 97.5 | 0.5 | 0.5 | | | | 1.5 | 32 | 1.7 | 22 |
| 97.5 | 0.5 | | 0.5 | | | 1.5 | 39 | 1.8 | 23 |
| 97.0 | 0.5 | 0.5 | 0.5 | | | 1.5 | 39 | 1.8 | 24 |
| 93.0 | 0.5 | 0.5 | | | | 6.0 | 18 | 1.7 | 19 |
| 93 | 0.5 | | 0.5 | | | 6.0 | 21 | 1.8 | 20 |
| 92.5 | 0.5 | 0.5 | 0.5 | | | 6.0 | 20 | 1.7 | 22 | mill for 5 hours. The mixture thus obtained was dried and calcined in air for 1 hour at 750°C and furnace-cooled to room temperature. Further additive components listed in Table 4 were added to the calcined mixture and thus added mixture was pulverized in a wet mill for 20 hours. Then, the pulverized mixture was dried, pressed, sintered and lapped in the same manner as that in Example 1, and the electrodes were applied to the resultant bodies, similarly to Example 1. The electric characteristics of the resultant resistors are shown in Table 4, in which the $\sigma_c$-value is calculated for 100 resistor pieces. While the $\sigma_c$-value of resistors having the same composition as that of Table 4 and being made by usual process ranges from 2.0 to 3.5, the $\sigma_c$-value for the invention is remarkably reduced to 1.2 to 1.6, as shown in Table 4.

mill for 5 hours. The mixture thus obtained was dried and calcined in air for 1 hour at 750°C and furnace-cooled to room temperature. Further additive components listed in Table 5 were added to the calcined mixture and thus added mixture was pulverized in wet mill for 20 hours. Then, the pulverized mixture was dried, pressed, sintered and lapped in the same manner as that in Example 1, and the electrodes were applied to the resultant bodies, similarly to Example 1. The electric characteristics of the resultant resistors are shown in Table 5, in which the $\sigma_c$-value is calculated for 100 resistor pieces. While the $\sigma_c$-value of resistors having the same composition as that of Table 5 and being made by usual process ranges from 2.0 to 3.5, the $\sigma_c$-value for the invention is remarkably reduced to 1.2 to 1.5, as shown in Table 5.

Table 4

| Starting Materials (mole %) | | | | | | | | | | | | | | Electric Characteristics of Resultant Resistors | | |
|---|---|---|---|---|---|---|---|---|---|---|---|---|---|---|---|---|
| First Additive | | | | Further Additive component | | | | | | | | | | C (at given current of 1mA) | $\sigma_c$ | n 0.1–1mA |
| ZnO | $Bi_2O_3$ | CoO | $MnO_2$ | $TiO_2$ | $SnO_2$ | $Cr_2O_3$ | $SiO_2$ | NiO | MgO | BaO | $B_2O_3$ | CaO | CdO | | | |
| 98.0 | 0.5 | 0.5 | 0.5 | 0.5 | | | | | | | | | | 32 | 1.5 | 26 |
| 98.0 | 0.5 | | 0.5 | 0.5 | 0.5 | | | | | | | | | 37 | 1.5 | 28 |
| 97.5 | 0.5 | 0.5 | 0.5 | 0.5 | 0.5 | | | | | | | | | 39 | 1.6 | 28 |
| 98.45 | 0.5 | 0.5 | | 0.5 | | 0.05 | | | | | | | | 23 | 1.4 | 21 |
| 98.45 | 0.5 | | 0.5 | 0.5 | | 0.05 | | | | | | | | 25 | 1.5 | 21 |
| 97.95 | 0.5 | 0.5 | 0.5 | 0.5 | | 0.05 | | | | | | | | 25 | 1.5 | 21 |
| 98.0 | 0.5 | 0.5 | | 0.5 | | | 0.5 | | | | | | | 41 | 1.6 | 29 |
| 98.0 | 0.5 | | 0.5 | 0.5 | | | 0.5 | | | | | | | 44 | 1.5 | 30 |
| 97.5 | 0.5 | 0.5 | 0.5 | 0.5 | | | 0.5 | | | | | | | 44 | 1.5 | 31 |
| 98.0 | 0.5 | 0.5 | | 0.5 | | | | 0.5 | | | | | | 48 | 1.5 | 28 |
| 98.0 | 0.5 | | 0.5 | 0.5 | | | | 0.5 | | | | | | 50 | 1.5 | 31 |
| 97.5 | 0.5 | 0.5 | 0.5 | 0.5 | | | | 0.5 | | | | | | 51 | 1.6 | 30 |
| 98.0 | 0.5 | 0.5 | | 0.5 | | | | | 0.5 | | | | | 24 | 1.3 | 23 |
| 98.0 | 0.5 | | 0.5 | 0.5 | | | | | 0.5 | | | | | 30 | 1.5 | 25 |
| 97.5 | 0.5 | 0.5 | 0.5 | 0.5 | | | | | 0.5 | | | | | 27 | 1.5 | 25 |
| 98.0 | 0.5 | 0.5 | 0.5 | 0.5 | | | | | | 0.5 | | | | 25 | 1.4 | 21 |
| 98.0 | 0.5 | 0.5 | 0.5 | 0.5 | | | | | | | | | 0.5 | 28 | 1.4 | 23 |
| 97.5 | 0.5 | 0.5 | 0.5 | 0.5 | | | | | | | 0.5 | | | 28 | 1.5 | 22 |
| 97.5 | 0.5 | 0.5 | 0.5 | 0.5 | | | | | | | | 0.5 | | 29 | 1.5 | 20 |
| 97.5 | 0.5 | 0.5 | 0.5 | 0.5 | | | | | | | | | | 20 | 1.5 | 18 |
| 97.0 | 0.5 | 0.5 | 0.5 | 0.5 | | 0.5 | 0.5 | | | | | | | 38 | 1.3 | 34 |
| 97.0 | 0.5 | 0.5 | 0.5 | 0.5 | 0.5 | | | 0.5 | | | | | | 44 | 1.3 | 34 |
| 97.8 | 0.5 | 0.5 | 0.5 | 0.5 | | | | | | 0.1 | 0.05 | | | 21 | 1.2 | 27 |
| 97.35 | 0.5 | 0.5 | 0.5 | 0.5 | | | | | | 0.1 | 0.5 | | | 22 | 1.2 | 28 |

EXAMPLE 5

As starting materials, zinc oxide (ZnO) and bismuth oxide ($Bi_2O_3$), listed in Table 5, were mixed in a wet Table 5

| Starting Materials (mole %) | | | | | | | | | | | | | | Electric Characteristics of Resultant Resistors | | |
|---|---|---|---|---|---|---|---|---|---|---|---|---|---|---|---|---|
| First Additive | | | | Further Additive component | | | | | | | | | | C (at given current of 1mA) | $\sigma_c$ | n 0.1–1mA |
| ZnO | $Bi_2O_3$ | CoO | $MnO_2$ | BeO | $SnO_2$ | $Cr_2O_3$ | $SiO_2$ | NiO | MgO | BaO | $B_2O_3$ | CdO | CaO | | | |
| 96.5 | 0.5 | 0.5 | | 2.0 | 0.5 | | | | | | | | | 51 | 1.4 | 24 |
| 96.5 | 0.5 | | 0.5 | 2.0 | 0.5 | | | | | | | | | 56 | 1.4 | 25 |
| 96.5 | 0.5 | 0.5 | 0.5 | 2.0 | 0.5 | | | | | | | | | 54 | 1.5 | 26 |
| 92.95 | 0.5 | 0.5 | | 6.0 | | 0.05 | | | | | | | | 21 | 1.5 | 16 |
| 92.95 | 0.5 | | 0.5 | 6.0 | | 0.05 | | | | | | | | 24 | 1.4 | 18 |
| 92.45 | 0.5 | 0.5 | 0.5 | 6.0 | | 0.05 | | | | | | | | 23 | 1.5 | 20 |
| 96.5 | 0.5 | 0.5 | | 2.0 | | 0.5 | | | | | | | | 55 | 1.4 | 24 |
| 96.5 | 0.5 | | 0.5 | 2.0 | | 0.5 | | | | | | | | 59 | 1.4 | 27 |
| 96.0 | 0.5 | 0.5 | 0.5 | 2.0 | | 0.5 | | | | | | | | 58 | 1.4 | 25 |
| 92.5 | 0.5 | 0.5 | | 6.0 | | | 0.5 | | | | | | | 32 | 1.4 | 17 |
| 92.5 | 0.5 | | 0.5 | 6.0 | | | 0.5 | | | | | | | 38 | 1.4 | 19 |
| 92.0 | 0.5 | 0.5 | 0.5 | 6.0 | | | 0.5 | | | | | | | 38 | 1.5 | 19 |
| 96.5 | 0.5 | 0.5 | 0.5 | 2.0 | | | | 0.5 | | | | | | 31 | 1.4 | 25 |
| 96.5 | 0.5 | 0.5 | 0.5 | 2.0 | | | | | | | | 0.5 | | 33 | 1.4 | 25 |
| 96.0 | 0.5 | 0.5 | 0.5 | 2.0 | | | | | | | | | 0.5 | 33 | 1.3 | 26 |
| 92.5 | 0.5 | 0.5 | 0.5 | 6.0 | | | | | 0.5 | | | | | 18 | 1.5 | 15 |
| 92.5 | 0.5 | 0.5 | 0.5 | 6.0 | | | | | | 0.5 | | | | 19 | 1.4 | 15 |
| 92.0 | 0.5 | 0.5 | 0.5 | 6.0 | | | | | | | 0.5 | | | 20 | 1.5 | 16 |
| 95.9 | 0.5 | 0.5 | 0.5 | 2.0 | 0.1 | 0.5 | | | | | | | | 35 | 1.3 | 38 |
| 95.9 | 0.5 | 0.5 | 0.5 | 2.0 | 0.1 | | 0.5 | | | | | | | 24 | 1.2 | 37 |

Table 5-continued

| Starting Materials (mole %) | | | | | | | | | | | | | | Electric Characteristics of Resultant Resistors | | |
|---|---|---|---|---|---|---|---|---|---|---|---|---|---|---|---|---|
| First Additive | | Further Additive component | | | | | | | | | | | | C (at given current of 1mA) | $\sigma_r$ | n |
| ZnO | $Bi_2O_3$ | CoO | $MnO_2$ | BeO | $SnO_2$ | $Cr_2O_3$ | $SiO_2$ | NiO | MgO | BaO | $B_2O_3$ | CdO | CaO | | | 0.1–1mA |
| 95.9 | 0.5 | 0.5 | 0.5 | 2.0 | | | 0.1 | 0.5 | | | | | | 36 | 1.3 | 38 |
| 92.4 | 0.5 | 0.5 | 0.5 | 6.0 | | 0.1 | | | | | 0.1 | | | 18 | 1.4 | 21 |
| 92.4 | 0.5 | 0.5 | 0.5 | 6.0 | | 0.1 | | | 0.1 | 0.1 | | | | 18 | 1.3 | 24 |
| 92.2 | 0.5 | 0.5 | 0.5 | 6.0 | 0.1 | | | | 0.1 | 0.1 | | | | 20 | 1.2 | 31 |

What is claimed is:

1. A method of making a voltage-dependent resistor comprising zinc oxide, as a main constituent, and 0.1 to 5.0 mole percent of bismuth oxide ($Bi_2O_3$), as a first additive, said method comprising the steps of preparing a mixture comprising zinc oxide and the balance at least more than 0.05 mole percent of bismuth oxide, calcining the thus prepared mixture of zinc oxide (ZnO) and bismuth oxide ($Bi_2O_3$) at a temperature between 650° and 950°C, adding to the thus calcined mixture a further additive comprising at least one member selected from the group consisting of 0.1 to 5.0 mole percent of cobalt oxide (CoO) and 0.1 to 5.0 mole percent of manganese oxide (MnO), and the remainder of the first additive, bismuth oxide ($Bi_2O_3$) when the total amount of 0.1 to 5.0 mole percent thereof is not added in the previous step of calcining, pulverizing the thus made mixture containing the further additive, sintering the thus pulverized mixture so as to obtain a sintered body, and applying electrodes to opposite surfaces of said sintered body.

2. A method as claimed in claim 1, wherein said further additives comprise at least one member selected from the group consisting of 0.1 to 5.0 mole percent of cobalt oxide (CoO) and 0.1 to 5.0 mole percent of manganese oxide ($MnO_2$) and one member selected from the group consisting of 0.01 to 5.0 mole percent of antimony oxide ($Sb_2O_3$), 0.1 to 5.0 mole percent of titanium oxide ($TiO_2$), and 1.0 to 10.0 mole percent of beryllium oxide (BeO).

3. A method as claimed in claim 1, wherein said further additive comprises at least one memeber selected from the group consisting of 0.1 to 5.0 mole percent of cobalt oxide (CoO) and 0.1 to 5.0 mole percent of manganese oxide ($MnO_2$); 0.01 to 5.0 mole percent of antimony oxide ($Sb_2O_3$); and at least one member selected from the group of, 0.02 to 3.0 mole percent of tin oxide ($SnO_2$), 0.02 to 3.0 mole percent of chromium oxide ($Cr_2O_3$), 0.1 to 10.0 mole percent of silicon dioxide ($SiO_2$), 0.1 to 5.0 mole percent of nickel oxide (NiO), 0.1 to 5.0 mole percent of magnesium oxide (MgO), 0.02 to 5.0 mole percent of barium oxide (BaO) and 0.02 to 5.0 mole percent of boron oxide ($B_2O_3$).

4. A method as claimed in claim 1, wherein said further additive comprises at least one member selected from the group consisting of 0.1 to 5.0 mole percent of cobalt oxide (CoO) and 0.1 to 5.0 mole percent of manganese oxide ($MnO_2$); 0.1 to 5.0 mole percent of titanium oxide ($TiO_2$); and at least one member selected from the group of 0.02 to 3.0 mole percent of tin oxide ($SnO_2$), 0.02 to 3.0 mole percent of chromium oxide ($Cr_2O_3$), 0.1 to 10.0 mole percent of silicon oxide ($SiO_2$), 0.1 to 5.0 mole percent of nickel oxide (NiO), 0.1 to 5.0 mole percent of magnesium oxide (MgO), 0.02 to 5.0 mole percent of barium oxide (BaO), 0.02 to 5.0 mole percent of boron oxide ($B_2O_3$), 0.1 to 5.0 mole percent of calcium oxide (CaO) and 0.1 to 5.0 mole percent of cadmium oxide (CdO).

5. A method as claimed in claim 1, wherein said further additive comprises at least one member selected from the group consisting of 0.1 to 5.0 mole percent of cobalt oxide (CoO) and 0.1 to 5.0 mole percent of manganese oxide ($MnO_2$); 1.0 to 10.0 mole percent of beryllium oxide (BeO); and at least one member selected from the group of 0.02 to 3.0 mole percent of tin oxide ($SnO_2$), 0.02 to 3.0 mole percent of chromium oxide ($Cr_2O_3$), 0.1 to 10.0 mole percent of silicon oxide ($SiO_2$), 0.1 to 5.0 mole percent of nickel oxide (NiO), 0.1 to 5.0 mole percent of magnesium oxide (MgO), 0.02 to 5.0 mole percent of barium oxide (BaO), 0.02 to 5.0 mole percent of boron oxide ($B_2O_3$), 0.1 to 5.0 mole percent of calcium oxide (CaO) and 0.1 to 5.0 mole percent of cadmium oxide (CdO).

6. A method as claimed in claim 1, wherein said step of calcining is performed at a temperature between 750° and 850°C.

* * * * *